Dec. 20, 1927.  1,653,094
C. T. FLEMING
JAR FOR FISHING AND DRILLING TOOLS
Original Filed Dec. 23, 1925
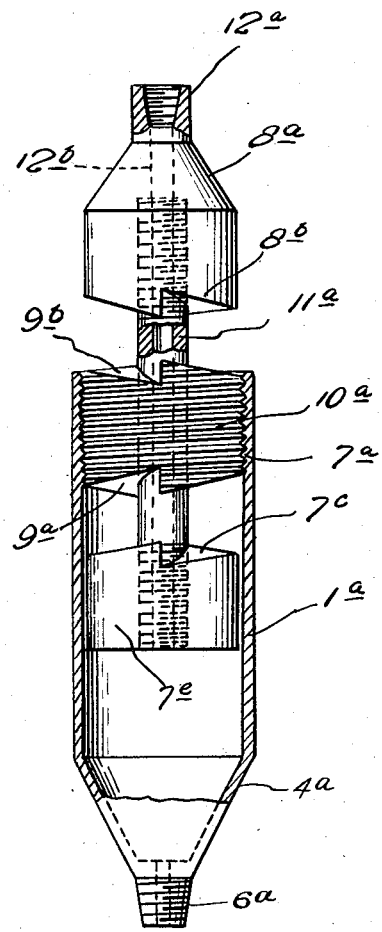
Inventor
C. T. Fleming,
By Clarence A. O'Brien
Attorney Patented Dec. 20, 1927.

1,653,094

UNITED STATES PATENT OFFICE.

CHARLES TRUMAN FLEMING, OF TAFT, CALIFORNIA, ASSIGNOR OF ONE-HALF TO WILLIAM J. HAY, OF TAFT, CALIFORNIA.

JAR FOR FISHING AND DRILLING TOOLS.

Original application filed December 23, 1925, Serial No. 77,314. Divided and this application filed May 25, 1926. Serial No. 111,615.

The general object of my present invention is the provision of a jar for fishing and drilling tools, possessed of a wide range of usefulness and adapted to be used to advantage for the several purposes hereinafter set forth.

The invention consists in the improvement as hereinafter described and definitely claimed, the said improvement constituting a different species from that claimed in my contemporary application, filed December 23, 1925, Serial No. 77,314, of which this application is a division.

In the accompanying drawing, forming part of this specification:—

The figure is a view partly in section and partly in elevation illustrative of the embodiment of my invention designed more particularly for use in conjunction with fishing and various kinds of repair work.

Among other elements my novel jar comprises a casing $1^a$. The said casing $1^a$ is tapered at $4^a$ and appropriately threaded at $6^a$, and the upper end portion of the said casing $1^a$ is interiorly threaded as designated by $7^a$ for the engagement of a member $10^a$ which is fixed with respect to the casing $1^a$ and is provided with lower and upper reversely arranged clutch faces $9^a$ and $9^b$, respectively. A tubular member $11^a$ is movable rectilinearly and about its axis in a bore in the member $10^a$, and carried on the lower portion of the said tubular member $11^a$ is a member $7^e$ with a clutch face $7^d$ complementary to and adapted to cooperate with the before mentioned clutch face $9^a$. Fixedly secured on the tubular member $11^a$ is a member $8^a$ appropriately threaded as designated by $12^a$, and at its lower end the said member $8^a$ is provided with a clutch face $8^b$ complementary to the before mentioned clutch face $9^b$ of the member $10^a$.

The embodiment described in the foregoing is designed more particularly for combination fishing of all kinds incident to general repair work capable of being accomplished by a rotary outfit, and manifestly the said embodiment is adapted for the adequate circulation of water through the bore $12^b$ of the member $8^a$ as well as through the bore of the tubular member $11^a$. It will also be readily appreciated from the drawing that the member $7^e$ is capable of being clutched to the member $10^a$, and that the member $8^a$, in turn, is capable of being clutched to the member $10^a$.

It will further be manifest from the drawing that the member $10^a$ being held stationary, upward movement of the member $7^e$ followed by rotation of the said member $7^e$ toward the right will bring about an upward jar. Again it will be understood that if the member $10^a$ be held stationary and the member $8^a$ be pressed downwardly and turned toward the right, a downward jar will be brought about. It will also be appreciated that with every revolution one or two complete jars, as desired, will be brought about either on the up thrust or the down thrust.

My novel jar is susceptible of use with any tool such as is in general use for drilling or fishing.

I have specifically described the preferred embodiment of my invention in order to impart an exact understanding of the same. I do not desire, however, to be understood as limiting myself to the structure disclosed, nor to the relative arrangement of the elements, my invention being defined by my appended claim, within the scope of which structural changes and changes in relative arrangement may be made without affecting my invention.

Having described my invention, what I claim and desire to secure by Letters-Patent, is:—

A jar comprising a hollow casing body having a conduit in the lower portion thereof, a member threadedly secured in the upper end portion of said casing body and provided with reversely arranged clutch faces, and also provided with a central bore, and a rectilinearly movable and rotatable member having a tubular portion extending through and movable in the said bore of the first named member and also having at opposite sides of said member and threadedly secured on the tubular portion, portions with reversely arranged clutch faces for cooperation with the first-named member; the clutch portion on the upper portion of the tubular part being provided with a bore in communication with the said tubular portion of the rectilinearly movable and rotatable member, whereby the body and the rectilinearly movable member have continuous circulation passages.

In testimony whereof I affix my signature.

CHARLES TRUMAN FLEMING.